(12) United States Patent
Wang et al.

(10) Patent No.: US 12,266,384 B2
(45) Date of Patent: Apr. 1, 2025

(54) TUNNELING MAGNETORESISTANCE DEVICE WITH MAGNETICALLY SOFT HIGH MOMENT FREE LAYER

(71) Applicant: Headway Technologies, Inc., Milpitas, CA (US)

(72) Inventors: Hui-Chuan Wang, Pleasanton, CA (US); Shohei Kawasaki, Sunnyvale, CA (US); Kunliang Zhang, Fremont, CA (US); Sangmun Oh, San Jose, CA (US); Zheng Gao, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/093,732

(22) Filed: Jan. 5, 2023

(65) Prior Publication Data

US 2024/0233999 A1    Jul. 11, 2024

(51) Int. Cl.
*G11B 5/39* (2006.01)
*G11B 5/31* (2006.01)
*H01F 10/32* (2006.01)
*H01F 41/18* (2006.01)

(52) U.S. Cl.
CPC .......... *G11B 5/3909* (2013.01); *G11B 5/3163* (2013.01); *G11B 5/3906* (2013.01); *H01F 10/3254* (2013.01); *G11B 2005/3996* (2013.01); *H01F 41/18* (2013.01); *Y10T 29/49034* (2015.01)

(58) Field of Classification Search
None
See application file for complete search history.

(56) References Cited

U.S. PATENT DOCUMENTS

| | | | |
|---|---|---|---|
| 7,760,474 B1* | 7/2010 | Huai et al. | G11B 5/3909 360/324.12 |
| 2004/0047086 A1* | 3/2004 | Wang et al. | G11B 5/3903 360/324.12 |
| 2006/0049472 A1* | 3/2006 | Diao et al. | H01F 10/3272 257/421 |
| 2007/0188941 A1* | 8/2007 | Gill | G11B 5/3909 360/324.2 |
| 2007/0217088 A1* | 9/2007 | Freitag et al. | G11B 5/3909 360/324.12 |
| 2007/0242395 A1* | 10/2007 | Bailey | G11B 5/3909 360/324.2 |
| 2007/0297103 A1* | 12/2007 | Zhang et al. | G11B 5/3909 360/324.12 |

(Continued)

*Primary Examiner* — Craig A. Renner
(74) *Attorney, Agent, or Firm* — DLA Piper LLP (US)

(57) ABSTRACT

The present embodiments relate to a tunnel magnetoresistance (TMR) element. The TMR element can include a free layer comprising a metallic alloy that is doped using a dopant element. In some instances, the metallic alloy comprises a cobalt-iron (CoFe) alloy. The present embodiments relate to doping a small amount of an element (e.g., hafnium (Hf), tantalum (Ta), Yttrium (Y)) in a high flux CoFe layer of a tunnel magnetoresistance (TMR) element. The small amount of dopant can suppress a long-range order in the CoFe film. The amorphous state of a CoFe alloy can be induced by the dopant and result in a magnetically soft layer. A resistance of the TMR element can be modified based on an application of an external magnetic field to the free layer and the pin layer.

12 Claims, 6 Drawing Sheets

(56) References Cited

U.S. PATENT DOCUMENTS

| | | | | |
|---|---|---|---|---|
| 2008/0088983 | A1* | 4/2008 | Meyer et al. | G11B 5/3906 360/324.1 |
| 2013/0221460 | A1* | 8/2013 | Jan et al. | H01F 10/3254 257/421 |
| 2015/0311431 | A1* | 10/2015 | Zhou et al. | H01F 10/3254 257/421 |
| 2016/0118066 | A1* | 4/2016 | Nikolaev et al. | G11B 5/3906 432/18 |
| 2020/0403152 | A1* | 12/2020 | Xue et al. | H01F 10/3259 |

* cited by examiner

FIG. 6

TUNNELING MAGNETORESISTANCE DEVICE WITH MAGNETICALLY SOFT HIGH MOMENT FREE LAYER

TECHNICAL FIELD

Embodiments of the invention relate to the field of electro-mechanical data storage devices. More particularly, embodiments of the invention relate to the field of a hard disk drive (HDD) write head that includes a tunneling magnetoresistance (TMR) element.

BACKGROUND

Volumes of digital data can be stored on a disk drive, such as a Hard disk drive (HDD). The disk drive can comprise a head that can interact with a magnetic recording medium (e.g., a disk) to read and write magnetic data onto the disk. For instance, the disk drive can include a write head that is positioned near the disk and can modify a magnetization of the disk passing immediately under the write head.

An HDD head can include a tunnel magnetoresistance (TMR) sensor that comprises a magnetic sensor utilizing a TMR element, which can be a highly-sensitive reproducing element of an HDD head. The reading elements of HDD heads can be based on the magnetoresistance effect, which refers to a change in resistance induced by the application of an external magnetic field.

SUMMARY

The present embodiments relate to doping a small amount of an element (e.g., hafnium (Hf), tantalum (Ta), yttrium (Y)) in a high flux CoFe layer of a tunnel magnetoresistance (TMR) element. The small amount of dopant can suppress a long-range order in the CoFe film. The amorphous state of a CoFe alloy can be induced by the dopant and result in a magnetically soft layer. As an example, co-sputtering can be used to form CoFeHf and CoFeTa alloys. The co-sputtering method can allow for adjusting the composition of the dopant. Thin CoFeHf or CoFeTa films can be used as the free a TMR element. Magnetically soft (Hc 2~4 Oe) and high dR/R (CIPT dR/R>110% at RA 0.3) TMR reader sensors can also be obtained.

In a first example embodiment, a tunnel magnetoresistance (TMR) element is provided. The TMR element can include a free layer comprising a metallic alloy that is doped using a dopant element. In some instances, the metallic alloy comprises a cobalt-iron (CoFe) alloy.

In some instances, dopant element comprises hafnium (Hf) to generate a free CoFeHf alloy. In some instances, dopant element comprises tantalum (Ta) to generate a CoFeTa alloy. In some instances, dopant element comprises any of Hf, Ta, yttrium (Y), zirconium (Zr), niobium (Nb), molybdenum (Mo), tungsten (W), titanium (Ti), and silicon (Si). In some instances, a composition of the dopant element comprises an atomic percentage (at %) of between 0 and 20 percent.

The TMR element can also include a pin layer and a barrier layer disposed between the free layer and the pin layer. A resistance of the TMR element can be modified based on an application of an external magnetic field to the free layer and the pin layer.

In some instances, barrier layer comprises any of a magnesium oxide (MgO), aluminum oxide (AlOx), titanium oxide (TiOx), and zinc oxide (ZnOx). In some instances, the TMR element is part of a hard disk drive (HDD) system. In some instances, the pin layer comprises a metallic layer comprising CoFe and a dopant element comprising Hf to generate a pin layer comprising a CoFeHf alloy. In some instances, the pin layer comprises a metallic layer comprising CoFe and a dopant element comprising Ta to generate a pin layer comprising a CoFeTa alloy.

In another example embodiment, a device is provided. The device can include a free layer including a cobalt-iron (CoFe) metallic alloy that is doped using a dopant element that comprises hafnium (Hf) or tantalum (Ta). In some instances, the dopant element comprises any of Hf, Ta, yttrium (Y), zirconium (Zr), niobium (Nb), molybdenum (Mo), tungsten (W), titanium (Ti), and silicon (Si).

The device can also include a pin layer, and a barrier layer deposited between the free layer and the pin layer. In some instances, a barrier layer comprises any of a magnesium oxide (MgO), aluminum oxide (AlOx), titanium oxide (TiOx), and zinc oxide (ZnOx). In some instances, a resistance of the device is modified based on an application of an external magnetic field to the free layer and the pin layer.

In another example embodiment, a method for manufacturing a tunnel magnetoresistance (TMR) element is provided. The method can include depositing a barrier layer on a pin layer. The method can also include depositing a free layer on the barrier layer, the free layer comprising a metallic alloy. The method can also include doping the free layer with a dopant element to modify the metallic alloy of the free layer.

In some instances, the metallic alloy comprises a cobalt-iron (CoFe) alloy. In some instances, dopant element comprises hafnium (Hf) to generate a free CoFeHf alloy. In some instances, dopant element comprises tantalum (Ta) to generate a CoFeTa alloy. In some instances, the barrier layer comprises any of a magnesium oxide (MgO), aluminum oxide (AlOx), titanium oxide (TiOx), and zinc oxide (ZnOx). In some instances, the method can include doping the pin layer comprising a metallic layer comprising CoFe and a dopant element comprising any of: Hf to generate a pin layer comprising a CoFeHf alloy or Ta to generate a pin layer comprising a CoFeTa alloy.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A hard disk drive (HDD) can include a device capable of storing digital data. A head of the HDD can both read and/or write data to a magnetic storage media included in the HDD.

Figure 1:
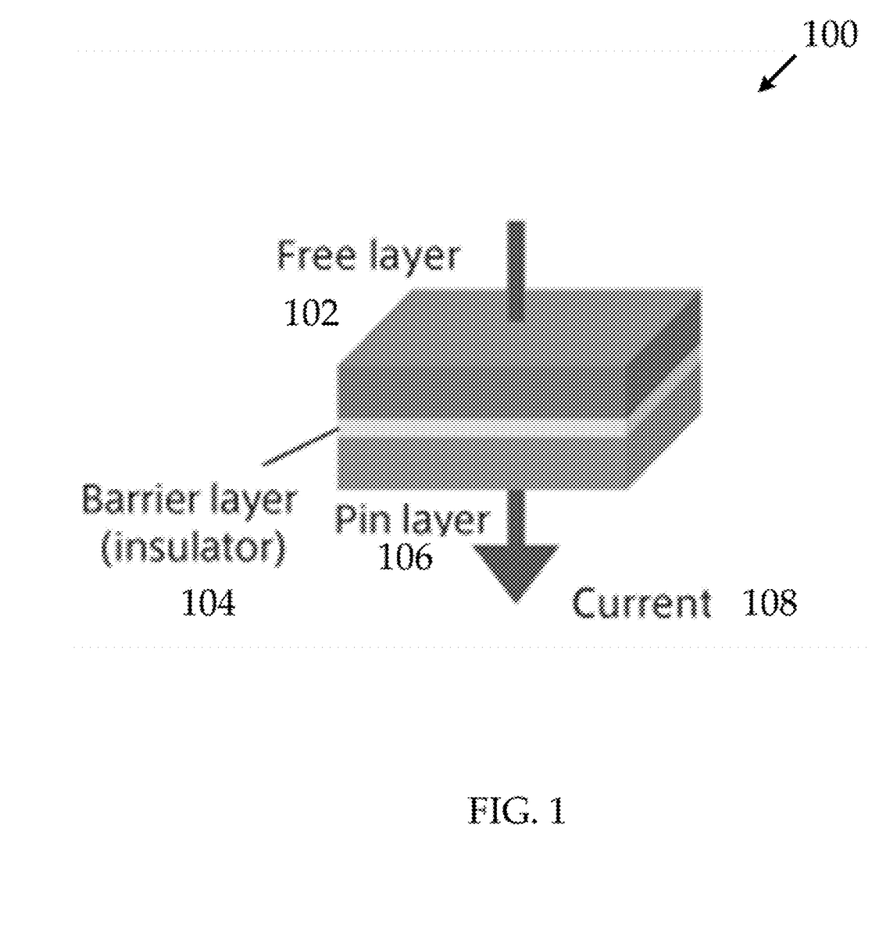
FIG. 1 illustrates an example TMR element according to an embodiment.

An HDD head can include a tunnel magnetoresistance (TMR) sensor that comprises a magnetic sensor utilizing a TMR element, which can be a highly-sensitive reproducing element of an HDD head. The reading elements of HDD heads can be based on the magnetoresistance effect, which refers to a change in resistance induced by the application of an external magnetic field. FIG. 1 illustrates an example TMR element 100.

As shown in FIG. 1, the TMR element 100 can include a free layer 102, a barrier layer 104, and a pin layer 106. The magnetic structure of a TMR element can be similar to that of a giant magnetoresistance effect (GMR) element, but, in a TMR element, the current (e.g., 108) can flow perpendicular to the film surface, while it flows horizontally to the film surface in a GMR element.

A TMR element can include a thin-film element with a structure in which a barrier layer (e.g., 104) made of a thin insulator of around 1 to 2 nm is sandwiched between two ferromagnetic layers (free layer 102, pin layer 106), made using thin-film processing technology. Although the magnetization direction of the pin layer is fixed, the magnetization direction of the free layer can change according to the external magnetic field direction. The electrical resistance of the TMR element can change along with this change in the free layer. The electrical resistance can become the smallest when the magnetization directions of the pin layer and free layer are in parallel, causing a large current to flow into the barrier layer.

Figure 2:
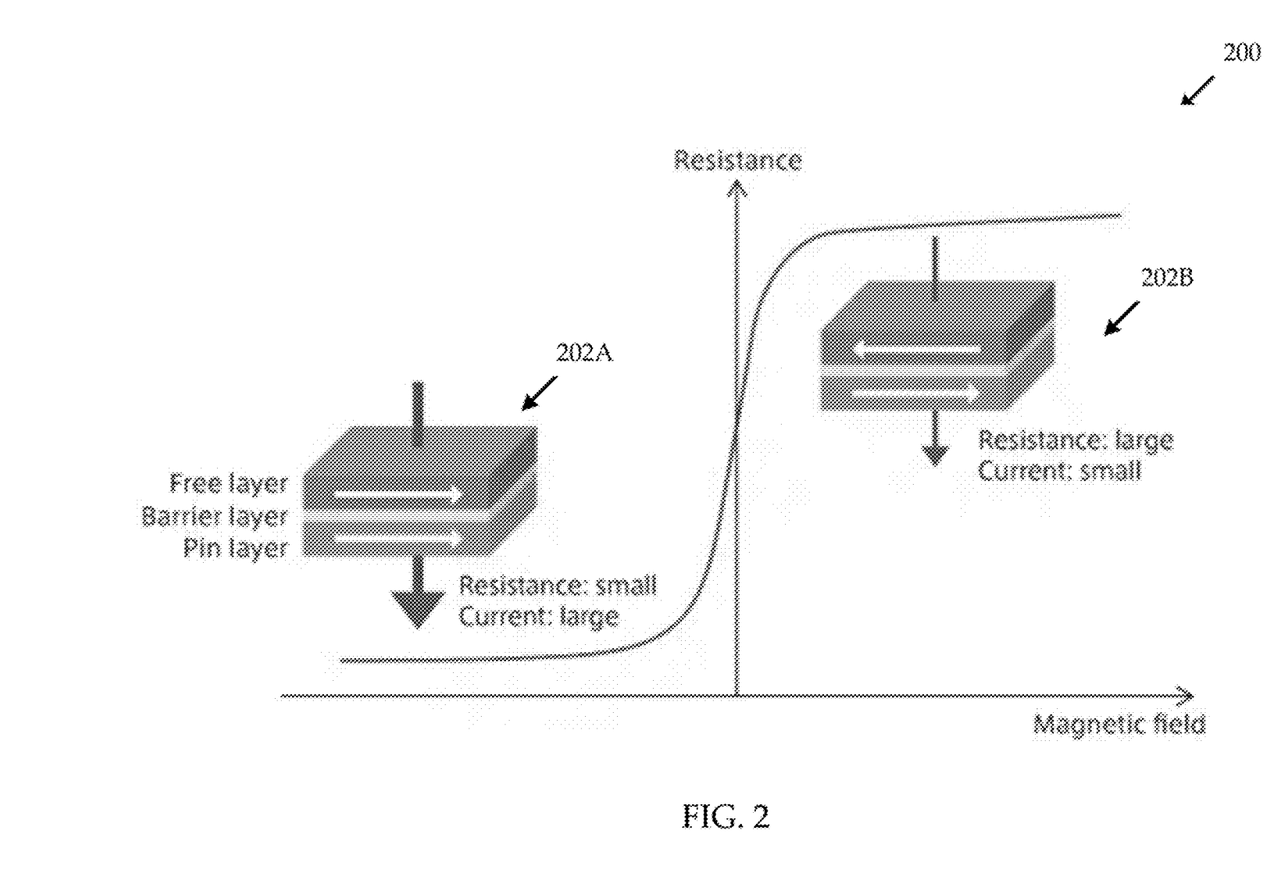
FIG. 2 is a graphical illustration of an impact of a resistance of a TMR element as the magnetic field changes.

In some instances, when the magnetization directions are antiparallel, the resistance can become extremely large, and almost no current flows into the barrier layer. FIG. 2 is a graphical illustration 200 of an impact of a resistance of a TMR element as the magnetic field changes. As shown in FIG. 2, a first TMR element 202A can include a smaller resistance and a larger current. Further, when the magnetization directions of the free layer and pin layer are in parallel, the resistance can become small and a large current can flow. In a second TMR element 202B, when the magnetization directions of the free layer and pin layer are antiparallel, the resistance can become large and only a weak current may flow.

The rate of change in the resistance of an element can be expressed by a value called the MR ratio. The MR ratios of anisotropic magnetoresistance effect (AMR) elements and GMR elements can be around 3% and 12% respectively. In contrast, the MR ratio of a TMR element can be around 100%. In a GMR element, in which a non-magnetic metal (e.g., Cu, etc.) can be sandwiched between two ferromagnetic layers, electron transfer can occur as electric conducts in the metal. In a TMR element, on the other hand, electron transfer can occur as a quantum mechanical tunnel effect. For this reason, when the pin layer and free layer are in an antiparallel, a TMR element can have an extreme characteristic in which electrons may not move almost at all, when compared to the characteristics of a GMR in which it may be hard for electrons to move. This can cause a TMR element to exhibit an extremely large MR ratio, in addition to giving a distinctive character to its output.

Such reasons can be why TMR elements are utilized as highly-sensitive reading element in many HDDs. Therefore, by using highly-sensitive TMR elements as magnetic sensors, extremely large output can be obtained. When a magnet is rotated on a TMR sensor, the magnetization direction of the free layer can follow the magnetic field direction of the magnet, and the resistance of the element can change continuously. Since the resistance value is proportional to the relative angle between the magnetization directions of the pin layer and free layer, it can be utilized as an angle sensor. The magnetization direction of the pin layer can be fixed, while the magnetization direction of the free layer can follow the external magnetic field direction. Since the resistance value of the element can be proportional to the relative angle between the magnetization directions of the pin layer and free layer, it can perform 360° angle detection as an angle sensor.

Further, a low temperature drift (changes in output caused by ambient temperature changes) can be a common characteristic for sensors. In many AMR sensors, for example, the angle error can become extremely large on the low or high temperature side. By contrast, a TMR sensor can maintain a stable angle accuracy in a broad temperature range (e.g., an angle error of ±0.6° or smaller in the magnetic field range of 20 to 80 mT and the temperature range of −40 to 150° C.). In addition, low aging deterioration can be another feature of TMR sensors.

Magnetic recording can be an efficient way to store a large amount of digital data. TMR sensors can include thin, magnetically soft free layers and high TMR ratios, which can be important for many high-density magnetic recording applications. Free layers with a high flux (e.g., CoFe) alloy can provide large magnetic moments, which can allow for thinning down the TMR stack while improving sensor performance. One of the drawbacks can be that the high flux CoFe alloys tend to have higher coercivity (Hc), which can make the free layer magnetically harder and less sensitive than what one expects in a real application. Finding a way to reduce the coercivity, while still maintaining the magnetic moment of a high Fe content CoFe free layer, can be beneficial.

The present embodiments relate to doping a small amount of an element (e.g., hafnium (Hf), tantalum (Ta), yttrium (Y)) in a high flux CoFe layer. The small amount of dopant can suppress a long-range order in the CoFe film. The amorphous state of a CoFe alloy can be induced by the dopant and result in a magnetically soft layer. As an example, co-sputtering can be used to form CoFeHf and CoFeTa alloys. The co-sputtering method can allow for adjusting the composition of the dopant. Thin CoFeHf or CoFeTa films can be used as the free a TMR element. Magnetically soft (Hc 2~4 Oe) and high dR/R (CIPT dR/R>110% at RA 0.3) TMR reader sensors can also be obtained. Free layer magnetic properties and B-H loopers are shown in the Table 1 and FIGS. 3-6 as described herein.

In some instances, a tunnel magnetoresistance (TMR) element is described. The TMR element can include a free layer comprising a CoFe alloy doped with a dopant element. The TMR element can also include a pin layer and a barrier layer disposed between the free layer and the pin layer. The free layer structure can include (CoFe-25 at %)-Hf, which can provide low Hc, anisotropic, high moment, and high dR/R. The free layer structure can also include (CoFe-25 at %)-Ta, which can result in low Hc, anisotropic, high moment and high dR/R. Any of Hf, Ta, yttrium (Y), zirconium (Zr), niobium (Nb), molybdenum (Mo), tungsten (W), titanium (Ti), and silicon (Si). can be used as the dopant to CoFex, with x=10~100 at %. The dopant can range from 0~20 at %. The barrier layer can include any of MgO, AlOx, TiOx, ZnOx. Further, any of the embodiments described with respect to the free layer can also be applied to the pin layer as well.

Table 1 below provides example free layer magnetic properties of (CoFe-25 at %) with a small amount of Hf or Ta dopant after 280 C, 5 h anneal.

TABLE 1

| Film Structure | Bst (nWb; easy axis) | Hc (Oe; easy axis) | Hk (Oe) |
|---|---|---|---|
| With Hf dopant in (CoFe-25 at %) | | | |
| 40Ta/MgO/66(CoFe-25at %)-Hf (650 w/30 w) | 2.292 | 3.010 | 33.100 |
| 40Ta/MgO/66(CoFe-25at %)-Hf (650 w/35 w) | 2.263 | 3.080 | 36.700 |
| 40Ta/MgO/66(CoFe-25at %)-Hf (650 w/40 w) | 2.241 | 3.100 | 37.000 |
| 40Ta/MgO/66(CoFe-25at %)-Hf (650 w/45 w) | 2.209 | 2.860 | 36.400 |
| 40Ta/MgO/66(CoFe-25at %)-Hf (700 w/30 w) | 2.326 | 3.100 | 37.000 |
| 40Ta/MgO/66(CoFe-25at %)-Hf (750 w/30 w) | 2.345 | 2.920 | 33.500 |
| 40Ta/MgO/66(CoFe-25at %)-Hf (800 w/30 w) | 2.355 | 3.320 | 34.100 |
| 40Ta/MgO/66(CoFe-25at %)-Hf (950 w/30 w) | 2.424 | 3.660 | 32.100 |
| With Ta dopant in (CoFe-25 at %) | | | |
| 40Ta/MgO/66(CoFe-25at %)-Ta (650 w/30 w) | 2.343 | 5.370 | 26.400 |
| 40Ta/MgO/66(CoFe-25at %)-Ta (650 w/35 w) | 2.290 | 3.630 | 29.200 |
| 40Ta/MgO/66(CoFe-25at %)-Ta (650 w/40 w) | 2.223 | 3.360 | 29.900 |
| 40Ta/MgO/66(CoFe-25at %)-Ta (650 w/45 w) | 2.181 | 3.370 | 29.100 |
| No dopant in (CoFe-25 at %) | | | |
| 40Ta/MgO/66(CoFe-25at %) (650 w) | 2.550 | 81.100 | N/A |

From Table 1 it can be seen that with a small amount of Hf or Ta dopant, the element can obtain a (CoFe-25 at %)-Hf or (CoFe-25 at %)-Ta free layer that can be magnetically soft, anisotropic, and have very minor magnetic moment dilution. Further, a free layer can be designed with a different magnetic moment and coercivity by adjusting the co-sputtering power ratio between the CoFe and the dopant.

Figure 3:
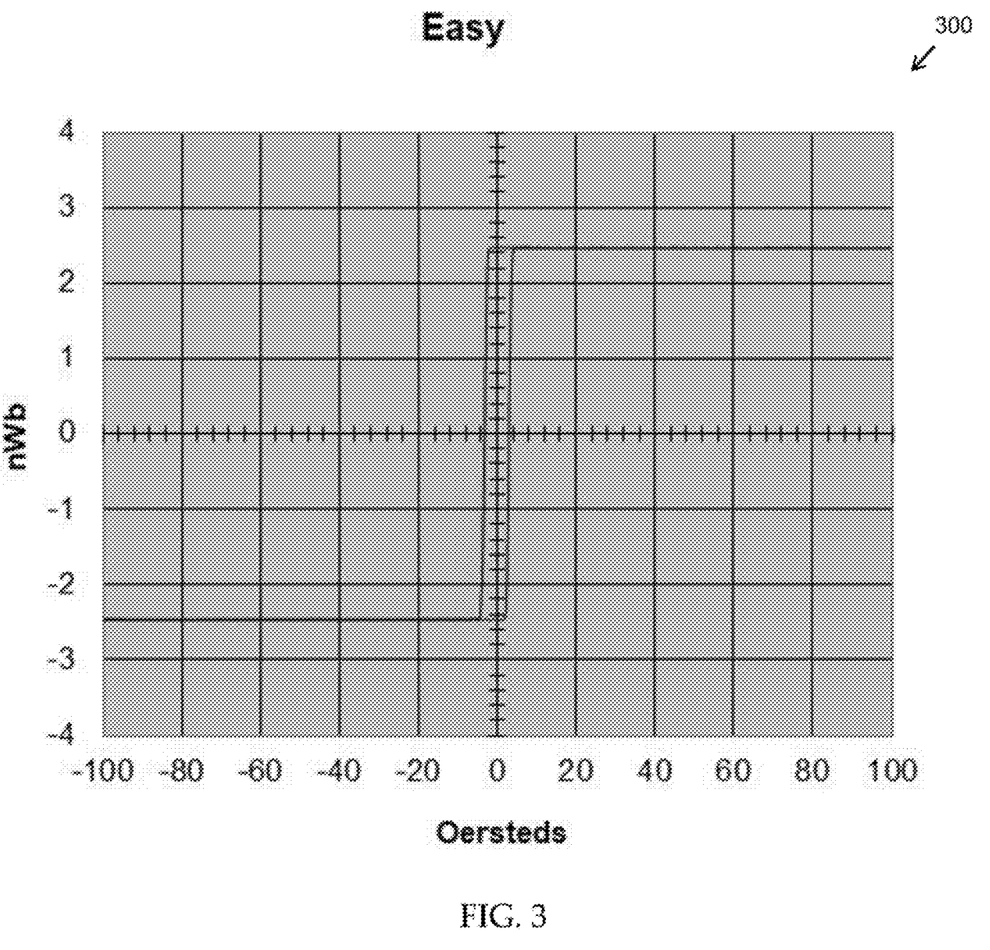
FIG. 3 provides a graphical illustration of a B-H looper with a first axis and with a Hf addition in CoFe-25 at % film according to an embodiment.

FIGS. 3-6 illustrate example B-H looper comparisons between free layers with (CoFe-25%)-Hf and CoFe-25% films. For example, FIG. 3 provides a graphical illustration 300 of a B-H looper with a first (e.g., an easy) axis and with a Hf addition in CoFe-25 at % film. As shown in FIG. 3, it can be seen that with a small amount of Hf dopant, a magnetically soft and very minor magnetic moment dilution (CoFe-25%)-Hf free layer can be fabricated.

Figure 4:
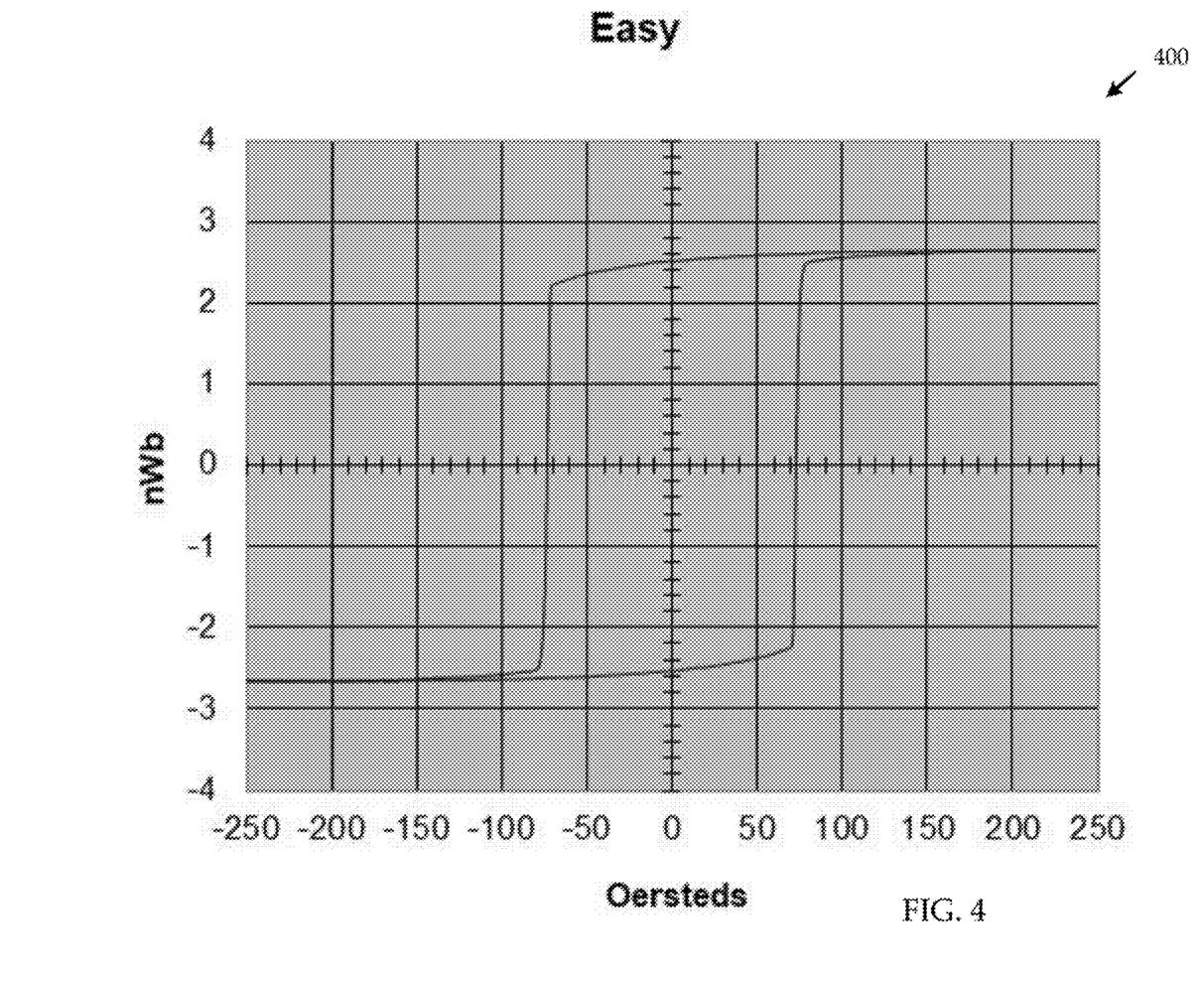
FIG. 4 provides a graphical illustration of a B-H looper with a first axis and without Hf addition in CoFe-25 at % film according to an embodiment.

FIG. 4 provides a graphical illustration 400 of a B-H looper with a first (e.g., easy) axis and without Hf addition in CoFe-25 at % film. In FIG. 4, it can be seen that without the dopant, the CoFe-25 at % free layer can have a large coercivity.

Figure 5:
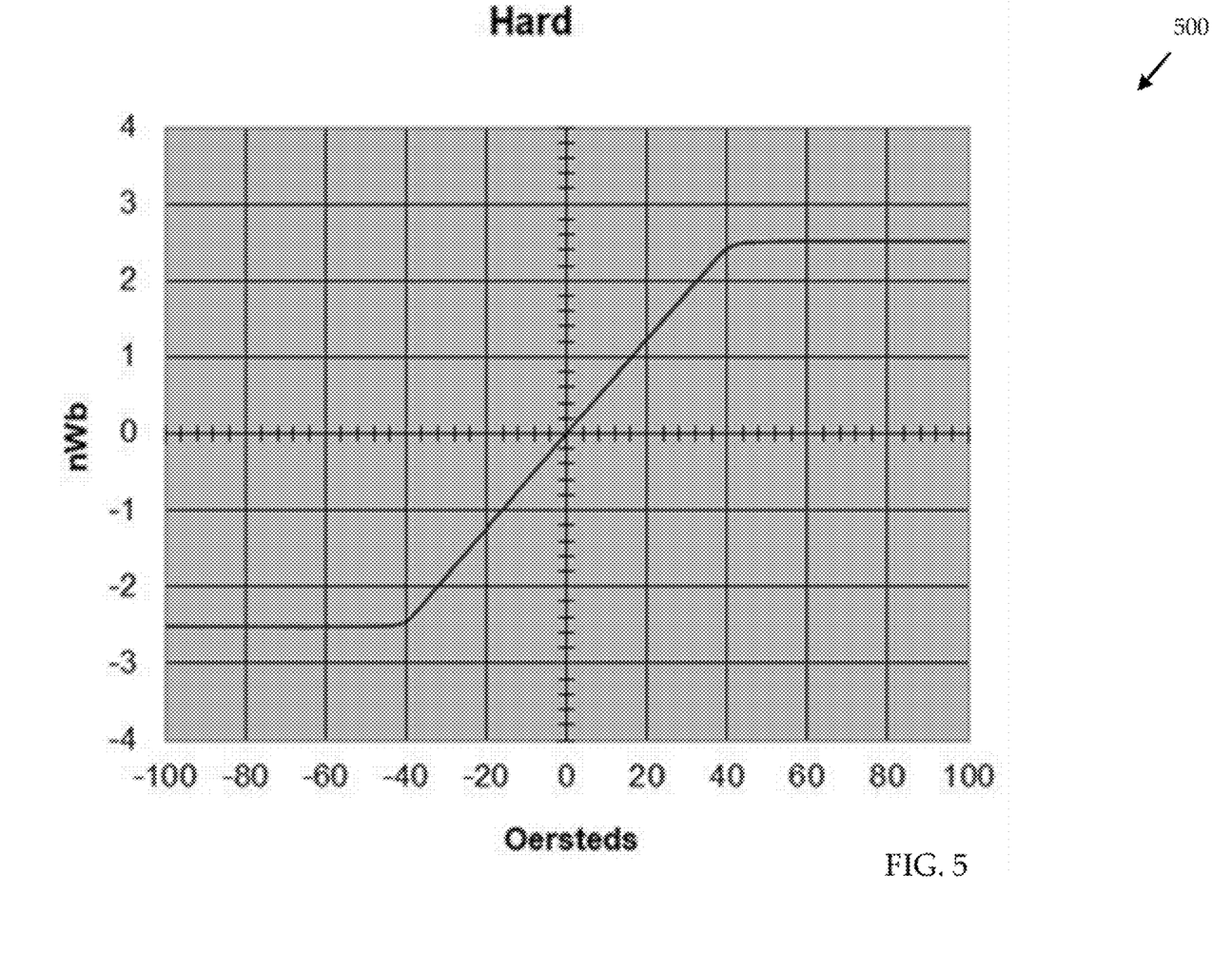
FIG. 5 provides a graphical illustration of a B-H looper with a second axis and with a Hf addition in CoFe-25 at % film according to an embodiment.

FIG. 5 provides a graphical illustration 500 of a B-H looper with a second (e.g., hard) axis and with a Hf addition in CoFe-25 at % film. In FIG. 5, it can be seen that with a small amount of Hf dopant, an anisotropic (CoFe-25 at %)-Hf free layer can be achieved.

Figure 6:
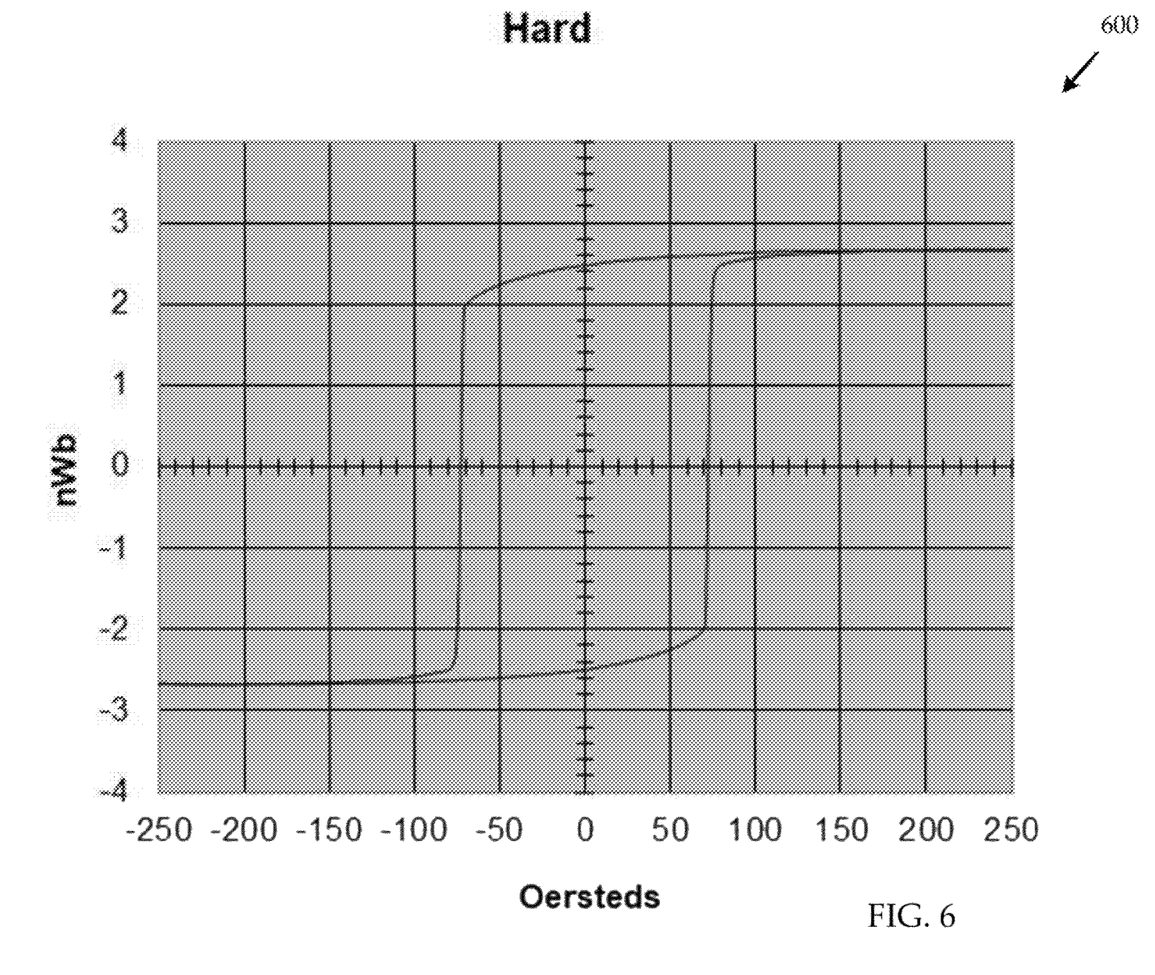
FIG. 6 provides a graphical illustration of a B-H looper with a second axis and without Hf addition in CoFe-25 at % film according to an embodiment.

FIG. 6 provides a graphical illustration 600 of a B-H looper with a second (e.g., hard) axis and without Hf addition in CoFe-25 at % film. By doping Hf or Ta in a CoFe-25 at % free layer, a magnetically soft, anisotropic, and high moment (CoFe-25 at %)-Hf and (CoFe-25 at %)-Ta free layer can be obtained. A TMR reader sensor with good device performance can be expected. With a high moment free layer, the thickness of the TMR reader sensor can also be reduced. This concept can also be applied to the pinned layer design.

If a high flux CoFe film are used for TMR reader free layer, it can provide a high magnetic moment and much better device sensitivity. One of the drawbacks is that high Fe content CoFe films may have high coercivity. For example, a small amount of Hf or Ta can be doped in CoFe-25 at % free layer, which can provide a magnetically soft, anisotropic, and minor moment dilution (CoFe-25 at %)-Hf and (CoFe-25 at %)-Ta free layer. This can also provide more freedom for a TMR reader sensor design.

In a first example embodiment, a tunnel magnetoresistance (TMR) element is provided. The TMR element can include a free layer comprising a metallic alloy that is doped using a dopant element. In some instances, the metallic alloy comprises a cobalt-iron (CoFe) alloy.

In some instances, dopant element comprises hafnium (Hf) to generate a free CoFeHf alloy. In some instances, dopant element comprises tantalum (Ta) to generate a CoFeTa alloy. In some instances, dopant element comprises any of Hf, Ta, yttrium (Y), zirconium (Zr), niobium (Nb), molybdenum (Mo), tungsten (W), titanium (Ti), and silicon (Si). In some instances, a composition of the dopant element comprises an atomic percentage (at %) of between 0 and 20 percent.

The TMR element can also include a pin layer and a barrier layer disposed between the free layer and the pin layer. A resistance of the TMR element can be modified based on an application of an external magnetic field to the free layer and the pin layer.

In some instances, barrier layer comprises any of a magnesium oxide (MgO), aluminum oxide (AlOx), titanium oxide (TiOx), and zinc oxide (ZnOx). In some instances, the TMR element is part of a hard disk drive (HDD) system. In some instances, the pin layer comprises a metallic layer comprising CoFe and a dopant element comprising Hf to generate a pin layer comprising a CoFeHf alloy. In some instances, the pin layer comprises a metallic layer comprising CoFe and a dopant element comprising Ta to generate a pin layer comprising a CoFeTa alloy.

In another example embodiment, a device is provided. The device can include a free layer including a Cobalt-Iron (CoFe) metallic alloy that is doped using a dopant element that comprises hafnium (Hf) or tantalum (Ta). In some instances, the dopant element comprises any of Hf, Ta, yttrium (Y), zirconium (Zr), niobium (Nb), molybdenum (Mo), tungsten (W), titanium (Ti), and silicon (Si).

The device can also include a pin layer, and a barrier layer disposed between the free layer and the pin layer. In some instances, a barrier layer comprises any of a magnesium oxide (MgO), aluminum oxide (AlOx), titanium oxide (TiOx), and zinc oxide (ZnOx). In some instances, a resistance of the device is modified based on an application of an external magnetic field to the free layer and the pin layer.

In another example embodiment, a method for manufacturing a tunnel magnetoresistance (TMR) element is provided. The method can include disposing a barrier layer on a pin layer. The method can also include disposing a free layer on the barrier layer, the free layer comprising a metallic alloy. The method can also include doping the free layer with a dopant element to modify the metallic alloy of the free layer.

In some instances, the metallic alloy comprises a cobalt-iron (CoFe) alloy. In some instances, dopant element comprises hafnium (Hf) to generate a free CoFeHf alloy. In some instances, dopant element comprises tantalum (Ta) to generate a CoFeTa alloy. In some instances, the barrier layer comprises any of a magnesium oxide (MgO), aluminum oxide (AlOx), titanium oxide (TiOx), and zinc oxide (ZnOx). In some instances, the method can include doping the pin layer comprising a metallic layer comprising CoFe and a dopant element comprising any of: Hf to generate a pin layer comprising a CoFeHf alloy or Ta to generate a pin layer comprising a CoFeTa alloy.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth herein are not intended to limit the breadth of the present invention, which should be inferred only from the following claims and their appropriately construed legal equivalents.

What is claimed is:

1. A device comprising:
   a free layer including a cobalt-iron (CoFe) metallic alloy that is doped using a dopant element that comprises hafnium (Hf) to generate a free CoFeHf alloy via a co-sputtering process that adjusts a composition of the dopant element by adjusting a co-sputtering power ratio between the metallic alloy and the dopant element, wherein an adjusted composition of the dopant element via the co-sputtering process comprises an atomic weight of the free layer comprising (CoFe-25 at %)-Hf;
   a pin layer; and
   a barrier layer deposited between the free layer and the pin layer, wherein a resistance of the device is modified based on an application of an external magnetic field to the free layer and the pin layer.

2. The device of claim 1, wherein the barrier layer comprises any of a magnesium oxide (MgO), aluminum oxide (AlOx), titanium oxide (TiOx), and zinc oxide (ZnOx).

3. A tunnel magnetoresistance (TMR) element comprising:
   a free layer comprising a metallic alloy comprising a cobalt-iron (CoFe) alloy that is doped using a dopant element comprising hafnium (Hf) to generate a CoFeHf alloy via a co-sputtering process that adjusts a composition of the dopant element by adjusting a co-sputtering power ratio between the metallic alloy and the dopant element, wherein an adjusted composition of the dopant element via the co-sputtering process comprises an atomic weight of the free layer comprising (CoFe-25 at %)-Hf;
   a pin layer; and
   a barrier layer deposited between the free layer and the pin layer, wherein a resistance of the TMR element is modified based on an application of an external magnetic field to the free layer and the pin layer.

4. The TMR element of claim 3, wherein the composition of the dopant element comprises an atomic percentage (at %) of between 0 and 20 percent.

5. The TMR element of claim 3, wherein the barrier layer comprises any of a magnesium oxide (MgO), aluminum oxide (AlOx), titanium oxide (TiOx), and zinc oxide (ZnOx).

6. The TMR element of claim 3, wherein the pin layer comprises a metallic layer comprising CoFe and a dopant element comprising Hf to generate a pin layer comprising a CoFeHf alloy.

7. The TMR element of claim 3, wherein the pin layer comprises a metallic layer comprising CoFe and a dopant element comprising Ta to generate a pin layer comprising a CoFeTa alloy.

8. The TMR element of claim 3, wherein the free layer comprises a magnetic flux ranging between 2.29 and 2.42 nano-Weber (nWb), a magnetic coercivity ranging between 3 and 3.66 Oersted (Oe), and an anisotropy field ranging between 32.1 and 33.1 Oe.

9. The TMR element of claim 8, wherein the co-sputtering process modifies the magnetic flux, magnetic coercivity, and the anisotropy field by adjusting the co-sputtering power ratio between the metallic alloy and the dopant element.

10. A method for manufacturing a tunnel magnetoresistance (TMR) element, the method comprising:
    depositing a barrier layer on a pin layer;
    depositing a free layer on the barrier layer, the free layer comprising a metallic alloy; and
    doping the free layer with a dopant element to modify the metallic alloy of the free layer via a co-sputtering process that adjusts a composition of the dopant element by adjusting a co-sputtering power ratio between the metallic alloy and the dopant element, wherein the metallic alloy comprises a cobalt-iron (CoFe) alloy and wherein the dopant element comprises hafnium (Hf) to generate a free CoFeHf alloy or tantalum (Ta) to generate a CoFeTa alloy, wherein an adjusted composition of the dopant element via the co-sputtering process comprises an atomic weight of the free layer comprising (CoFe-25 at %)-Hf or (CoFe-25 at %)-Ta.

11. The method of claim 10, wherein the barrier layer comprises any of a magnesium oxide (MgO), aluminum oxide (AlOx), titanium oxide (TiOx), and zinc oxide (ZnOx).

12. The method of claim 10, further comprising:
doping the pin layer comprising a metallic layer comprising CoFe and a dopant element comprising any of: Hf to generate a pin layer comprising a CoFeHf alloy or Ta to generate a pin layer comprising a CoFeTa alloy.

\* \* \* \* \*